United States Patent [19]

Eustathios et al.

[11] Patent Number: 5,549,472
[45] Date of Patent: Aug. 27, 1996

[54] CONTROL OF PROTECTIVE LAYER THICKNESS IN KILNS BY UTILIZING TWO LASER BEAMS

[75] Inventors: Vassiliou Eustathios, Newark, Del.; Walter R. Schaefer, Cherry Hill; Joseph F. Guinto, Pitman, both of N.J.

[73] Assignee: Rollins Environmental Services, Inc., Wilmington, Del.

[21] Appl. No.: 458,131

[22] Filed: Jun. 2, 1995

[51] Int. Cl.⁶ .................................................... F23G 5/00
[52] U.S. Cl. ............................................................ 432/103
[58] Field of Search ................................... 432/103, 105, 432/32; 356/375; 33/263, 262

[56] References Cited

U.S. PATENT DOCUMENTS

| | | |
|---|---|---|
| 2,230,141 | 1/1941 | Heuer ........................ 432/103 |
| 2,829,877 | 4/1958 | Davis ........................ 263/33 |
| 3,320,908 | 5/1967 | Ostrin ........................ 432/103 |
| 3,430,393 | 3/1969 | Landes ........................ 52/105 |
| 3,614,228 | 10/1971 | Lyon . |
| 3,817,619 | 6/1974 | Kawahara . |
| 4,355,904 | 10/1982 | Balasubramsnian . |
| 4,722,605 | 2/1988 | Livnat et al. . |
| 4,789,243 | 12/1988 | Mathur . |
| 4,991,966 | 2/1991 | Raymond . |
| 5,046,259 | 9/1991 | Tusting . |
| 5,146,795 | 9/1992 | Gebhart ........................ 432/32 |
| 5,148,238 | 9/1992 | Gebhart ........................ 356/375 |
| 5,228,398 | 7/1993 | Byerly et al. . |
| 5,298,977 | 3/1994 | Shintani et al. . |
| 5,299,933 | 4/1994 | Mosci ........................ 432/103 |
| 5,301,621 | 4/1994 | Vassiliou et al. . |
| 5,353,722 | 10/1994 | Vassiliou et al. . |
| 5,359,417 | 10/1994 | Muller et al. . |

Primary Examiner—Marguerite McMahon

[57] ABSTRACT

Methods and devices for protecting incineration kilns by optically determining the thickness of protective refractory and slag layers and taking suitable measures to avoid catastrophic failure due to excessive heat of the outer shell, usually made of carbon steel. The determination is performed by two laser beams. One laser beam is directed at low incidence at various points of the top surface of the protective layers inside the kiln, while the second laser beam is directed at a different incidence at the same points of the top surface of the protective layers inside the kiln.

24 Claims, 3 Drawing Sheets

CONTROL OF PROTECTIVE LAYER THICKNESS IN KILNS BY UTILIZING TWO LASER BEAMS

FIELD OF THE INVENTION

The present invention pertains to kilns, especially of the slagging type, which comprise an outer metal shell protected by an inside refractory layer, and a slag layer, and methods of protecting said kilns by determining the thickness of the protective refractory and slag layers by utilizing two laser beams.

BACKGROUND OF THE INVENTION

Incinerator kilns, and especially those of the rotary type, have an outside metallic shell, usually steel, the inside of which is fully covered by a thick ceramic or refractory, usually in the form of fire bricks having a total thickness exceeding in many cases 25 cm. These kilns usually operate at a exit gas or off-gas temperature in the range of about 1,600° to 2,400° F. The ceramic or refractory walls, however, are very vulnerable to erosion and corrosion, due to the hostile conditions created by the nature of incinerated materials and high temperatures, especially, if alkali metals are present.

If the viscosity of slag in the kiln is adequately high, it may form a rather thick viscous coating on the refractory and thus protect it from the hostile environment. However, when the viscosity of the slag is very low, the slag contributes to the erosion and corrosion of the ceramic or refractory, both chemically because it serves as a solvent and mechanically, as it allows foreign big pieces of abrasive material to act against the ceramic walls. If the slag is viscous to the point of becoming substantially solid, or if it has never been formed as a liquid, it becomes ineffective in promoting combustion of organic matter, and also in capturing toxic heavy metals. Therefore, it is imperative that the viscosity of the slag is very carefully monitored and controlled within a range of values. Thus, one of the objects of this invention is to control the viscosity of the slag in incinerating kilns.

U.S. Pat. No. 5,301,621 (Vassiliou et al.), which is incorporated herein by reference, describes methods and devices for slag viscosity detection and control through image analysis of dripping slag within rotary incineration kilns.

U.S. Pat. No. 5,228,398 (Byerly et al.), which is also incorporated herein by reference, describes methods and devices for controlling rotary incineration kilns by determining the position of the kiln outlet at which the slag is exiting.

U.S. Pat. No. 5,353,722 (Vassiliou et al.), which is also incorporated herein by reference, describes preventive slag-viscosity control by detection of alkali metals in the off-gases.

Our co-pending application Ser. No. 08/353,670, filed Dec. 12, 1994, which is also incorporated herein by reference, describes methods and devices for determining the thickness of the protective refractory or ceramic layer by using quantum failure identifiers.

U.S. Pat. No. 5,359,417 (Muller et al.) discloses a method for determination of the field of view observed through a surgical microscope. To achieve this determination, the relative current position of the plane of the field of view to the position of an object detail of interest is detected in a sighting method with the aid of a position detection system operating according to the laser triangulation principle. As soon as the plane of the field of view and the object detail are coincident, then with the aid of detected optical system data, the position of the object detail with reference to the surgical microscope is determined and, with the detected coordinates of the surgical microscope, the position of the field of view is determined in space. The position detecting system required for this purpose operates on an optical basis and can be integrated into the optics of the surgical microscope.

U.S. Pat. No. 5,298,997 (Shintani et al.) discloses a visual inspection method for parts mounted on printed circuit boards. According to this method, three different color light beams which are converged to a single light spot on the surface of a circuit board at predetermined incident angles, are irradiated onto the top surface of an electronic part mounted on the circuit board, then distances between the positions of the top surface of the electronic part to which the light beams are irradiated respectively, from the single light spot on the surface of the circuit board are measured, and the height and an inclined angle of the top surface of the electronic part are computed in accordance with the relationship between the measured distances and the incident angles.

U.S. Pat. No. 5,046,259 (Tusting) discloses measuring systems for making underwater measurements of relative positions and distances between a plurality of objects positioned on an ocean or lake floor basically, which include (a) at least one laser or other light source capable of projecting a collimated light beam therefrom, (b) a pan and tilt unit for moving the source light beam both angularly in vertical planes and in horizontal arcs, (c) a protractor or equivalent for measuring vertical angles through which the longitudinal axis of the light beam is moved by the pan and tilt unit, and (d) a compass unit for determining bearings of vertical plane positions of the light beam relative to magnetic or true north or other azimuth position. The system may include a plurality of lasers and a variety of methods of making measurements with both single and plural laser containing systems are disclosed.

U.S. Pat. No. 4,991,966 (Raymond) discloses an optical positioning method and system, which indicates achievement of a desired distance between a sprayhead and a workpiece. The desired distance is indicated when a primary light pattern converges with a secondary light pattern directed from other than a coaxial orientation. A procedure for programming a workpiece's contours is described, which also allows for visual verification of the program.

U.S. Pat. No. 4,789,243 (Mathur) discloses a system which automatically determines not only a distance from an object surface, but also an orientation of the device with respect to the object surface. This invention also discloses an arrangement of three or more position sensors for determining the orientation of the device, as well as the distance of the device from the object surface. Furthermore, this invention discloses a method of using parameter computation equations for determining the orientation and the distance of the device with respect to the object surface.

U.S. Pat. No. 4,722,605 (Livnat et al.) discloses a Moire system for linear measurement of an unknown distance defined by two surfaces, a collimated light source, a first grating between light source and the surfaces, a second grating positioned to receive collimated light from the surfaces after the light has reached the surfaces from the first grating, the first and second gratings being rotated relative to each other by a small angle θ, a screen located after the second grating for receiving Moire patterns caused by the first and second grating, and a mechanism for shifting the patterns as a function of the unknown distance whereby measurements of the amount of shifting is determinative of the unknown distance.

U.S. Pat. No. 4,355,904 (Balasubramsnian) discloses a scanning laser measurement system for measuring depthwise variations of surfaces relative to a focal plane of an optical system. Laser light is directed to a test surface, generally aligned with the focal plane, through focusing optics having an optical axis. Some of the light from a beam spot is retro scattered from the test surface and reimaged along a path generally parallel to the optical axis. Depthwise variations in the test surface with respect to the focal plane cause spatial displacements in the retrobeam relative to the optical axis. The retrobeam is directed to a filter which is partially reflective and partially transmissive. A pair of photodetectors is used to intercept reflected and transmitted components of the retrobeam and the intensity of these components is measured and used to compute centroid values for the retrobeam on the filter for various beam spots on the test surface. The computed centroid values are directly proportional to depthwise surface deviations from the focal plane. The beam is directed to various points on the test surface by an optical scanner. If the deviations in the test surface from the focal plane are so great that a retrobeam cannot be formed, the entire optical system is translated until beam focus can be achieved and a retrobeam formed. The extent of translation is a coarse measurement of depthwise variations in the test surface relative to the focal plane, while the previously mentioned centroid values yield a fine measurement of depthwise variations relative to the focal plane.

U.S. Pat. No. 3,817,619 (Kawahara) discloses a device for measuring the distance of an object from the forward end portion of an endoscope adapted to be inserted into a hollow portion of a living body or the like for the inspection thereof. The forward end portion of the endoscope is connected to a control housing through an elongated tube. The image of an object being viewed is formed in the forward end portion of an objective lens system, and the image is transmitted through the elongated tube by an ocular means provided in the control housing. The distance between the object and the forward end portion of the endoscope is determined using two beams of light emitted from the forward end portion toward the object so as to form a pair of light spots thereon. The distance of the object from the forward end portion of the endoscope may be determined by measuring the relative positions of the light spots with respect to the field of view of the endoscope. The distance of the object may also be determined by measuring the amount of change in direction of either or both of the beams of light required to bring the two light spots appearing in the field of view into registration.

U.S. Pat. No. 3,614,228 (Lyon) discloses an optical range finder having nonoverlapping complete images. According to this method, a 90–100 percent reflective first surface mirror is disposed to direct a reflected image to a 70 percent reflective, 30 percent transmitting beam splitter which reflects the reflected image along a light path parallel to the light path of the true image to thereby produce two separate full view images. The true image and reflected image are directed through a magnifying telescope having infinite projected crossed vertical and horizontal reticles. The mirror is rotatable to change the vertical displacement of the reflected image from the horizontal reticle and when the two images are equally displaced from the horizontal reticle, the range of the image may be found by triangulation.

U.S. Pat. No. 3,340,393 (Landes et al.) discloses a machine with lining bricks which have a face exposed to wear and side and end surfaces which equal the thickness of the bricks and are concealed by adjacent bricks, said thickness defining surfaces having applied thereto wear indicating means. Said means comprise a right angle triangular design in which one of the right angle edges is perpendicular to the exposed face of the brick and located at a distance from the adjacent parallel edge of the thickness defining surface to which the design is applied, the other of its right angle side edges being coincident with and visible at the exposed face of the brick, both said side edges being equal in length to the thickness of the brick. The length of the visible edge of the triangular design changes progressively as the exposed face becomes worn and at all times equals the thickness of the brick.

U.S. Pat. No. 2,289,877 (Davis) discloses refractory lining for rotary kilns, and refractory members useful for forming such lining, as well as processes for making the same.

None of the above references discloses, suggests, or implies methods or devices for determining and controlling the thickness of a protective layer in a kiln as described and claimed in the instant invention.

SUMMARY OF THE INVENTION

The present invention pertains to kilns, especially of the slagging type, which comprise an outer metal shell protected by an inside refractory layer, and a slag layer, and methods of protecting said kilns by optically determining the thickness of the protective refractory and slag layers, by utilizing two laser beams. More particularly, in an elongate kiln having a front end, a back end, an axis, an inside surface, and a protective layer on the inside surface, the protective layer having a thickness and a top surface, the present invention pertains to a method for determining the thickness of the protective layer comprising the steps of:

(a) directing a first laser beam in a manner to form a first spot on said point of the top surface;

(b) directing a second laser beam in a manner to form a second spot on said point of the top surface and on said first spot;

(c) computing the thickness of the protective layer by using at least partially mathematic relations; and (d) increasing the thickness of the protective coating, if said thickness falls under a predetermined value.

Also, the present invention pertains a kiln device comprising:

an elongate body having a front end, a back end, an axis, and an inside surface;

a protective layer on the inside surface, the protective layer having a thickness and a top surface;

a first laser having a first laser beam, the first laser beam adapted to produce a first spot on the top surface of the protective layer;

a second laser having a second laser beam, the second laser beam adapted to produce a second spot on the top surface of the protective layer, and on the first spot;

means for computing the thickness of the protective layer at the second point; and means for increasing the thickness of the protective layer, is said thickness has fallen under a predetermined value.

The thickness may be variable at different points of the of the top surface of the protective layer, from the front end to the back end of the kiln.

It is preferable that the axis of the kiln and the first and second laser beams are co-planar, that the first and second beams are initiated from fixed points at the front end of the kiln (or in other words, that the first and second lasers are located at fixed points at the front end of the kiln), and that the fixed points are coordinated with any movement of the kiln.

It is further preferable that increase of the thickness of the protective layer is performed by adding slag forming additives in the kiln, if said thickness falls under the predetermined value.

The methods and apparatuses of the instant invention are especially applicable to rotary kilns, such as rotary incineration kilns, for example.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

As aforementioned, the present invention pertains to kilns, especially of the rotary slagging type, which comprise an outer metal shell protected by an inside refractory layer, and a slag layer, and methods of protecting said kilns by optically determining the thickness of the protective refractory and slag layers.

Figure 1:
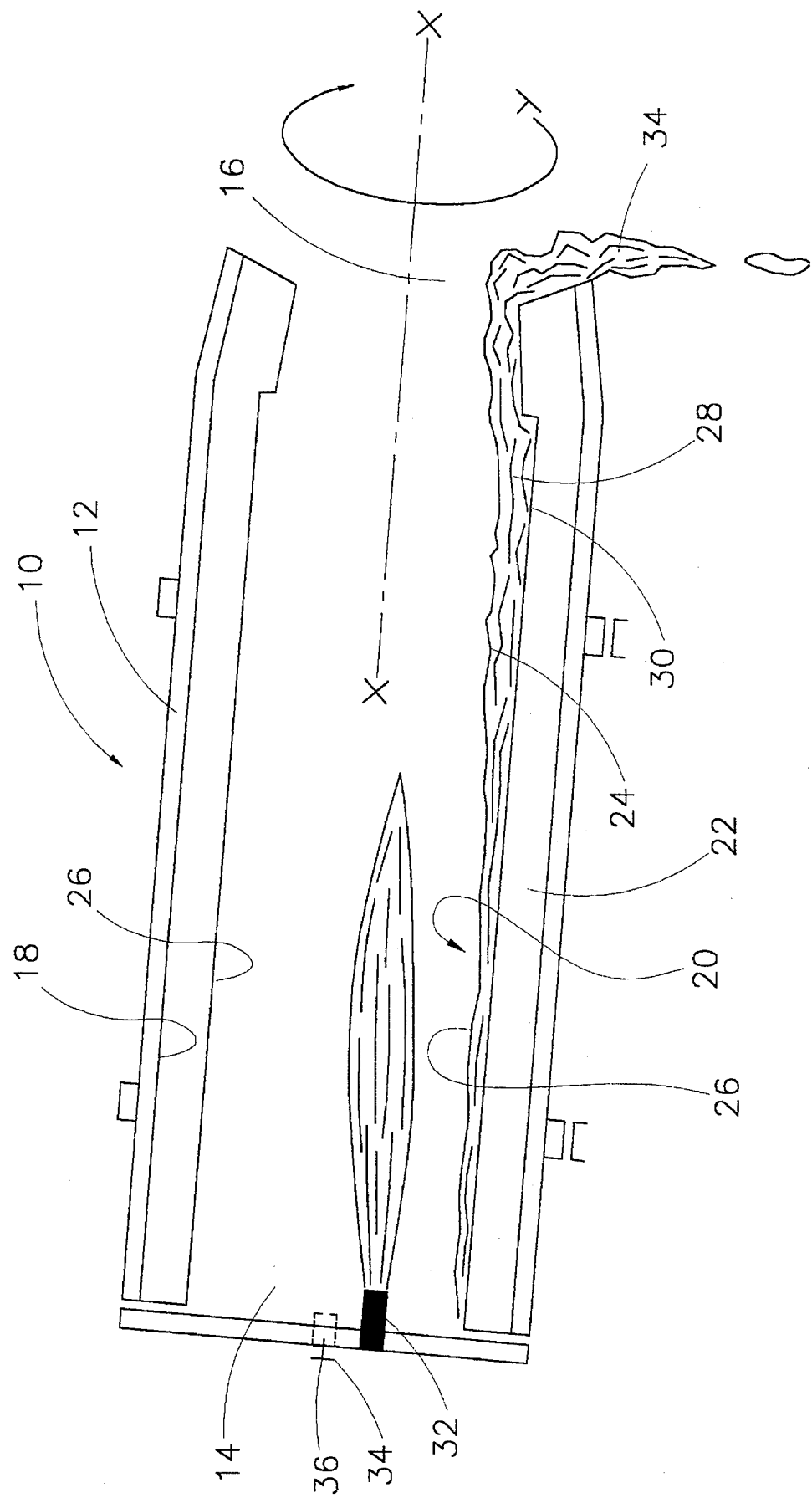
FIG. 1 is a schematic diagram illustrating a cross-sectional elevation of a rotary kiln according to the present invention.

In FIG. 1 there is depicted an elevation in the form of a cross section of an incineration rotary slagging kiln 10 comprising an elongate body 12, which is usually made of carbon steel. The elongate body 12 has a front end 14, a back end 16, an axis XX around which it revolves, as shown by arrow Y, and an inside surface 18.

On the inside surface 18, there is disposed a protective layer 20, usually of refractory material 22, which refractory material 22 may be covered or not covered by slag 24. The protective layer 20 has a top surface 26.

At the front end, there is disposed a burner 32. Waste (not shown) is usually fed in the vicinity of the front end 14 of the kiln 10. The waste moves slowly toward the back end 16, as it is being incinerated, and as the kiln rotates. When it reaches the back end 16 of the kiln 10, it has been fully incinerated into volatile gases leaving the kiln 10, and non-volatile solids, which, intimately mixed with the slag, become part of the exiting slag 34. Large and difficult to disintegrate objects are delayed in the slag pool region, where their incineration is maximized.

Since the temperature inside an incineration kiln is very high, nominally between 1,600° and 2,200° F., it is important that the protective layer 20 is always present, in order to avoid catastrophic deterioration of the cylindrical body 12. Thus, monitoring the thickness of the protective layer 20 is of essence. However, no satisfactory continuous methods have been found so far, which is mainly due to the hostile environment in the kiln. By "continuous methods" it is meant methods by which one may determine the thickness of the protective layer (refractory plus any slag present) at substantially any point of the kiln at substantially any time.

Although in most cases the refractory thickness decreases faster close to the back end 16 of the kiln 10, where a slag pool 28 may be formed and erosion may occur by the relatively large objects (not shown) abrading the refractory surface, decrease in thickness of the protective layer may also occur in substantially any portion of the kiln for a plurality of reasons, such as for example, unexpected refractory premature failure, temperature shock, mechanical shock, and the like, among others. Corrosion of the refractory also occurs by reactive slag, especially when the slag viscosity is low and the slag contains alkali metals. Regardless of what the reason is for decreased thickness of the protective layer 20, whether it is local or throughout the length of the kiln, monitoring of the thickness of the protective layer 20 is essential.

Figures 2A, 2B:
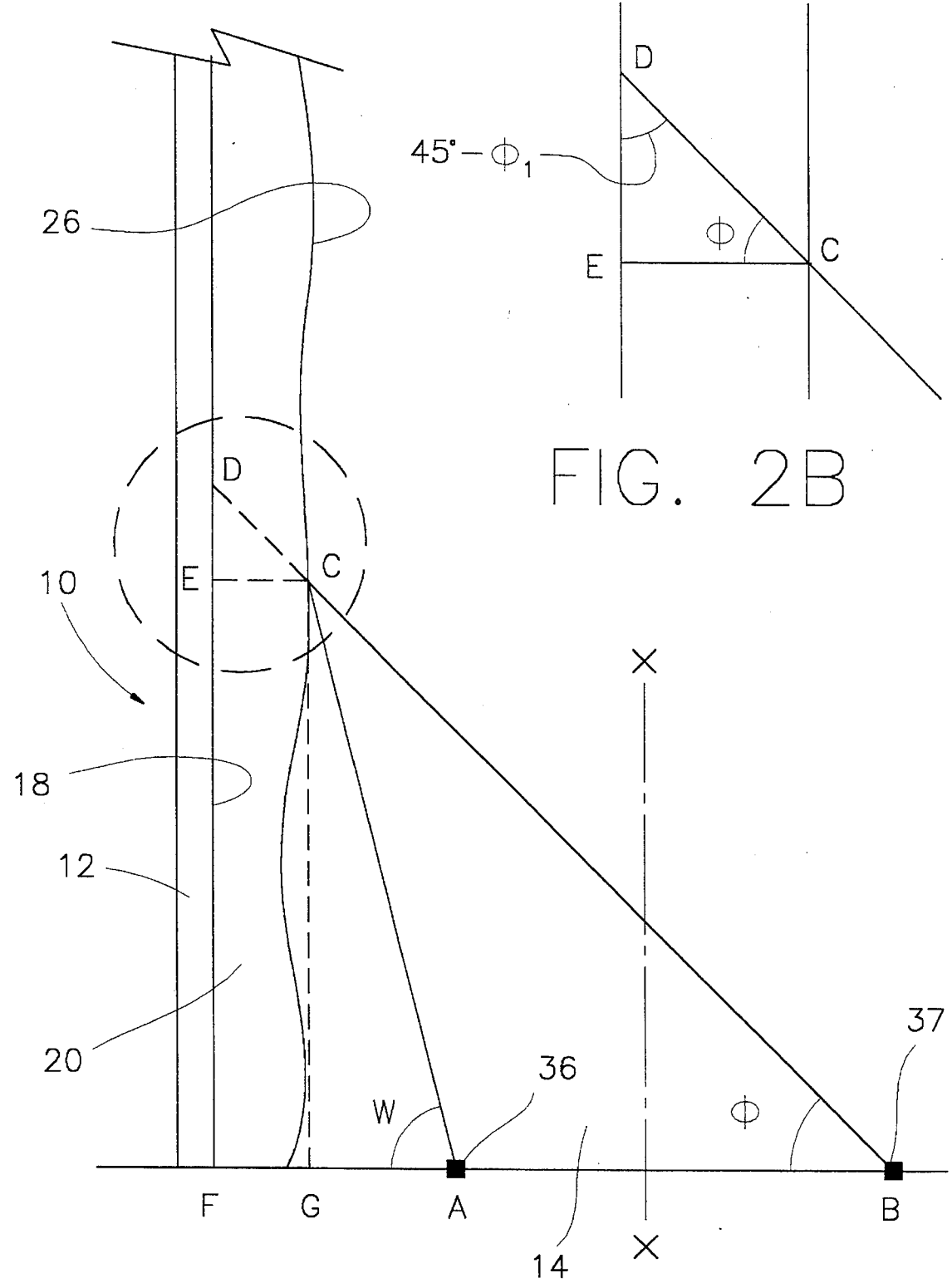
FIG. 2A is a schematic diagram illustrating a fragmental cross-sectional top view of the kiln of FIG. 1, with the first an the second radiation beam producing mechanisms positioned at the front end of the kiln.
FIG. 2B is a schematic diagram illustrating a magnified view of the circled area of FIG. 2A.

According to the present invention, there are also provided a first radiation beam producing mechanism, such as a first laser 36 for example, and a second radiation beam producing mechanism, such as a second laser 37 for example, better illustrated in FIGS. 2A and 2B. Lasers are very well suited as radiation beam producing mechanisms according to this invention, because the beams they produce are or can be exceptionally well collimated, and they form well distinguishable spots when they intersect with a non-transparent to the beam surface.

The first laser 36 and the second laser 37 are positioned at predetermined locations A and B, respectively, preferably in the vicinity of the front end 14 of the kiln 10. It is preferable that the line AB, defined by the locations A and B, intersects the axis XX of the kiln 10, and it is perpendicular to it. It is also preferable that the plane defined by line AB and the axis XX is substantially horizontal, except for the small inclination due to the inclination of the kiln 10 (in other words, all lines parallel to line AB and lying on the plane defined by line AB and axis XX are substantially horizontal).

It is critical that each of the lasers 36 and 37 comprise a protractor (not shown) for accurately measuring the angle between the direction of each beam and the line AB. The word protractor here means any appropriate device which is adapted to accurately measure the angle described above. Such devices are well known to the art.

It is further preferable that the lasers 36 and 37 are coordinated with the kiln 10, so that when the kiln 10 moves, the lasers 36 and 37 move along with it, so that the relative position or direction between the lasers 36 and 37, and their respective laser beams, and the kiln 10 remain unchanged. In the absence of such coordination, complicated calculations may have to be conducted in the operation of the system.

In operation, if the thickness t of the protective layer 20 is found to be lower than a predetermined value, steps are taken to increase the thickness to acceptable levels. The fastest way to do this is by adding in the kiln miscellaneous slag forming materials, such as sand and/or mixtures of sand and glass, for example, until the thickness attains the desired value. In some occasions, however, if the deterioration is extensive, it may be necessary to cool the kiln down, re-brick it and re-slag it. The latter is a very expensive process, albeit necessary. Thus, continuous monitoring of the thickness of the protective layer is of utmost importance in delaying any re-bricking operation for as long as possible.

The thickness t at a point C may be measured by initially turning each protractor to such a degree that the spot produced by the beam of the first laser 36 coincides with the spot produced by the beam of the second laser 37 at point C of the protective layer 20. At this point, the beam of the laser 36 forms a known angle $\omega$ with line AB, while the beam of the laser 37 forms a known angle $\phi$ with line AB.

The thickness t equals EC, which is the distance of point C from the inside surface 18 of the elongate body 12. Segment CD is an imaginary extension of the beam of the second laser 37 from point C to the point D, where said extension intersects the inside surface 18.

By using simple geometric and trigonometric relations and/or equations, the following are true.

Since segment CE is parallel to line AB, the angle formed by segments CE and CD equals $\phi$, as better shown in the magnified view of FIG. 2B.

Thus, $$t = CE = ED \cot \phi = (DF - EF) \cot \phi = (DF - CG) \cot \phi$$

Since $$DF = FB \tan \phi,$$

and $$CG = AB/(\cot \phi - \cot \omega)$$

then, $$t = [FB \tan \phi - AB/(\cot \phi - \cot \omega)] \cot \phi$$

The same procedure is repeated for determining the thickness of the protective layer at different points, which may be suspected points of deterioration at that time, or selected at desirable and predetermined intervals. As aforementioned, if the thickness at any of these points is lower than a certain desired predetermined value, steps are taken to increase the thickness to acceptable levels. Addition of additives, such as sand and/or glass for example, is helpful in controlling the slag thickness, and therefore, the thickness of the protective layer, as described for example in U.S. Pat. No. 5,301,621, U.S. Pat. No. 5,228,398, and U.S. Pat. No. 5,353,722.

It is preferable that the system is computerized, by well known to the art techniques, so that calibrations, determinations, calculations, and execution of appropriate actions for determining loss of thickness of the protective layer and correction are at least partially coordinated by a computer. It is also preferable, that in case that the thickness of the protective layer is reduced more than a desired degree, an alarm notifies the operator of this fact.

The lasers may be selected such that the spots produced by their respective beams on the protective layer are well defined and distinguishable from the surrounding regions. In order to assist this operation, in some occasions it may be necessary to reduce the temperature inside the kiln to such a degree that the laser spots become adequately visible and distinguishable.

If desired, the majority of the slag may be removed before the measurements are conducted, so that changes in the thickness of the refractory itself may be measured.

Figure 3:
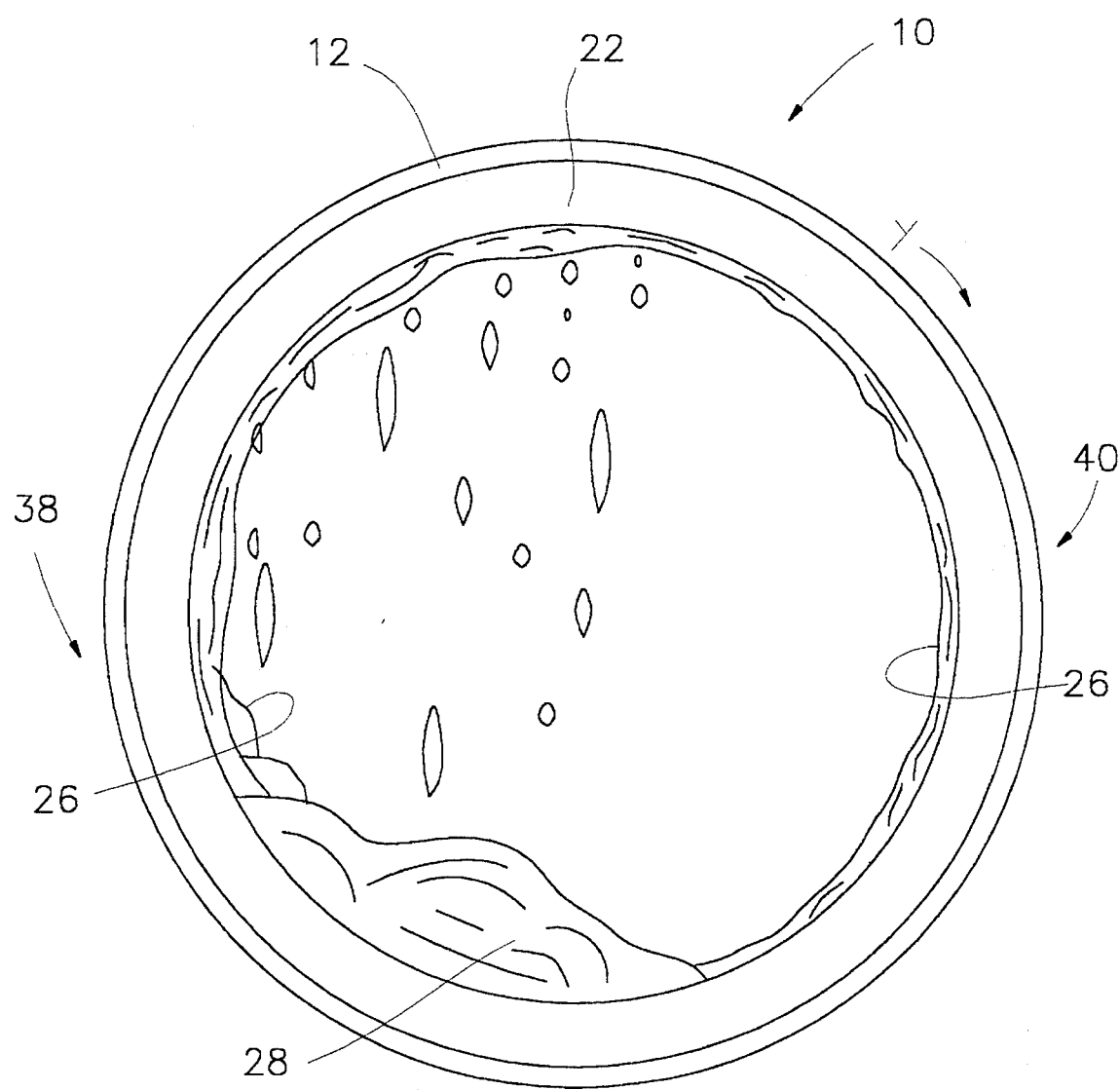
FIG. 3 is a schematic diagram illustrating a cross-sectional front view of the kiln of FIG. 1.

In the case of rotary kilns, as better shown in FIG. 3, the rotation in the direction of arrow Y causes accumulation of larger amounts of slag on one side 38 of the kiln as compared to the opposite side 40. The thickness measurements should preferably be made on the side 40, which would give higher reliability and accuracy.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. These combinations also lie within the realm of the present invention. Furthermore, any attempted explanations in the discussion are only speculative and are not intended to narrow the limits of this invention.

What is claimed is:

1. In an elongate kiln having a front end, a back end, an axis, an inside surface, and a protective layer on the inside surface, the protective layer having a thickness and a top surface,
   a method for controlling the thickness of the protective layer at a point of the top surface of said protective layer, comprising the steps of:
   (a) directing a first laser beam in a manner to form a first spot on said point of the top surface;
   (b) directing a second laser beam in a manner to form a second spot on said point of the top surface and on said first spot;
   (c) computing the thickness of the protective layer by using at least partially mathematic relations; and
   (d) increasing the thickness of the protective coating, if said thickness falls under a predetermined value.

2. A method as defined in claim 1, wherein the thickness is variable at different points from the front end to the back end of the kiln.

3. A method as defined in claim 2, wherein the axis of the kiln and the first and second laser beams are co-planar.

4. A method as defined in claim 3, wherein the first and second beams are initiated from fixed points at the front end of the kiln.

5. A method as defined in claim 4, wherein the fixed points are coordinated with any movement of the kiln.

6. A method as defined in claim 1, wherein the first and second beams are initiated from fixed points at the front end of the kiln.

7. A method as defined in claim 6, wherein the fixed points are coordinated with any movement of the kiln.

8. A method as defined in claim 2, wherein the first and second beams are initiated from fixed points at the front end of the kiln.

9. A method as defined in claim 8, wherein the fixed points are coordinated with any movement of the kiln.

10. A method as defined in claim 1, further comprising a step of adding slag forming additives in the kiln, if said thickness falls under the predetermined value.

11. A method as defined in claim 10, wherein the kiln is a rotary kiln.

12. A method as defined in claim 11, wherein the kiln is an incineration kiln.

13. A kiln device comprising:
    an elongate body having a front end, a back end, an axis, and an inside surface;
    a protective layer on the inside surface, the protective layer having a thickness and a top surface;
    a first laser having a first laser beam, the first laser beam adapted to produce a first spot on the top surface of the protective layer;

a second laser having a second laser beam, the second laser beam adapted to produce a second spot on the top surface of the protective layer, and on the first spot;

means for computing the thickness of the protective layer at the second point; and means for increasing the thickness of the protective layer, if said thickness has fallen under a predetermined value.

14. A device as defined in claim 13, wherein the thickness is variable at different points from the front end to the back end of the kiln.

15. A device as defined in claim 14, wherein the axis of the kiln and the first and second laser beams are co-planar.

16. A device as defined in claim 15, wherein the first and second lasers are located at fixed points at the front end of the kiln.

17. A device as defined in claim 16, wherein the fixed points are coordinated with any movement of the kiln.

18. A device as defined in claim 13, wherein the first and second lasers are located at fixed points at the front end of the kiln.

19. A device as defined in claim 18, wherein the fixed points are coordinated with any movement of the kiln.

20. A device as defined in claim 14, wherein the first and second lasers are located at fixed points at the front end of the kiln.

21. A device as defined in claim 20, wherein the fixed points are coordinated with any movement of the kiln.

22. A device as defined in claim 13, further comprising means for adding slag forming additives in the kiln, if said thickness falls under the predetermined value.

23. A device as defined in claim 22, wherein the kiln is a rotary kiln.

24. A device as defined in claim 23, wherein the kiln is an incineration kiln.

* * * * *

UNITED STATES PATENT AND TRADEMARK OFFICE
CERTIFICATE OF CORRECTION

PATENT NO. : 5,549,472
DATED : August 27, 1996
INVENTOR(S) : Vassiliou et al.

It is certified that error appears in the above-indentified patent and that said Letters Patent is hereby corrected as shown below:

Title page, insert

Under "United States Patent [19]"
        Delete "Eustahios et al." and insert - Vassiliou et al. --

In [75]
        Delete "Vassiliou Eustathios" and insert -- Eustathios Vassiliou Signed and Sealed this Twenty-fourth Day of December, 1996

Attest:

BRUCE LEHMAN

Attesting Officer      Commissioner of Patents and Trademarks